(12) United States Patent
Arellano

(10) Patent No.: US 7,641,273 B2
(45) Date of Patent: Jan. 5, 2010

(54) VEHICLE HEADLINERS AND METHODS OF USING THE SAME

(75) Inventor: Nora Arellano, An Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 181 days.

(21) Appl. No.: 11/961,286

(22) Filed: Dec. 20, 2007

(65) Prior Publication Data
US 2009/0160222 A1    Jun. 25, 2009

(51) Int. Cl.
*B60R 13/01* (2006.01)
(52) U.S. Cl. .................................................. 296/214
(58) Field of Classification Search ............... 296/214, 296/39.1; 428/131, 43; 29/700
See application file for complete search history.

(56) References Cited

U.S. PATENT DOCUMENTS

| | | | |
|---|---|---|---|
| 3,477,759 A * | 11/1969 | Swift et al. | 296/191 |
| 4,840,832 A | 6/1989 | Weinle et al. | |
| 4,958,878 A | 9/1990 | Kempkers | |
| 5,280,991 A | 1/1994 | Weiland | |
| 5,688,022 A | 11/1997 | Adams et al. | |
| 5,823,611 A | 10/1998 | Daniel et al. | |
| 6,865,795 B2 | 3/2005 | Hernandez et al. | |
| 2004/0061358 A1 | 4/2004 | Vishey et al. | |
| 2006/0113810 A1* | 6/2006 | Kuhl et al. | 296/24.34 |

* cited by examiner

*Primary Examiner*—Hilary Gutman
(74) *Attorney, Agent, or Firm*—Dinsmore & Shohl LLP

(57) ABSTRACT

Vehicle headliners and methods of installation include headliners with a substrate layer having at least one handling component formed within the substrate layer, the handling component having a perforation between the handling component and the surrounding substrate layer, wherein the handling component aids in the handling of the headliner during installation.

20 Claims, 3 Drawing Sheets

VEHICLE HEADLINERS AND METHODS OF USING THE SAME

TECHNICAL FIELD

The present invention generally relates to vehicle headliners and methods of installing vehicle headliners to the roof of a vehicle.

BACKGROUND

Headliners are utilized in vehicles to cover the interior and underside of a vehicle's roof. Conventional headliners generally comprise a fabric layer matching the interior color of a vehicle and commonly include cutout areas that are used to provide an open area for interior features such as sunroofs, dome lights, safety handles and overhead consoles. Because vehicle headliners are large, rigid and often flimsy, installation of the headliner into the small space of a vehicle is a difficult task that is both time consuming and costly and often requires the use of robots with numerous external vacuum suction cups used to hold the headliner in place. These methods are costly, and also increase the risk that the headliner will be damaged during installation.

Accordingly, a vehicle headliner that is easy to handle and install into a vehicle is desired.

SUMMARY

According to one embodiment, a vehicle headliner is provided. The vehicle headliner comprises a substrate layer having at least one handling component associated with the substrate layer, the handling component having a perforation between the handling component and the surrounding substrate layer, wherein the handling component aids in the handling of the headliner.

According to another embodiment, a vehicle headliner is provided. The vehicle headliner comprises a fabric layer, a substrate layer, a plurality of handling components formed within the substrate layer and a plurality of perforation lines located between the handling components and the surrounding substrate layer, wherein the handling components are removable from the substrate layer.

According to yet another embodiment, a method of installing a headliner in a vehicle is provided. The method comprises providing a headliner comprising a substrate layer, at least one handling component secured to the substrate layer and a plurality of perforation lines located between the handling component and the surrounding substrate layer, moving the headliner from a first location to a vehicle location, positioning the headliner, affixing the headliner to the roof of the vehicle and removing the handling component.

These and additional features can be more fully understood in view of the following detailed description, in conjunction with the drawings.

BRIEF DESCRIPTION OF THE DRAWINGS

The embodiments set forth in the drawings are illustrative and exemplary in nature and not intended to be limited of the inventions defined by the claims. Moreover, the individual features of the drawings will be more fully apparent and understood in view of the detailed description. The following detailed description of specific embodiments of the present invention can be best understood when read in conjunction with the following drawings, where like structure is indicated with like reference numerals and in which:

DETAILED DESCRIPTION

Figure 1:
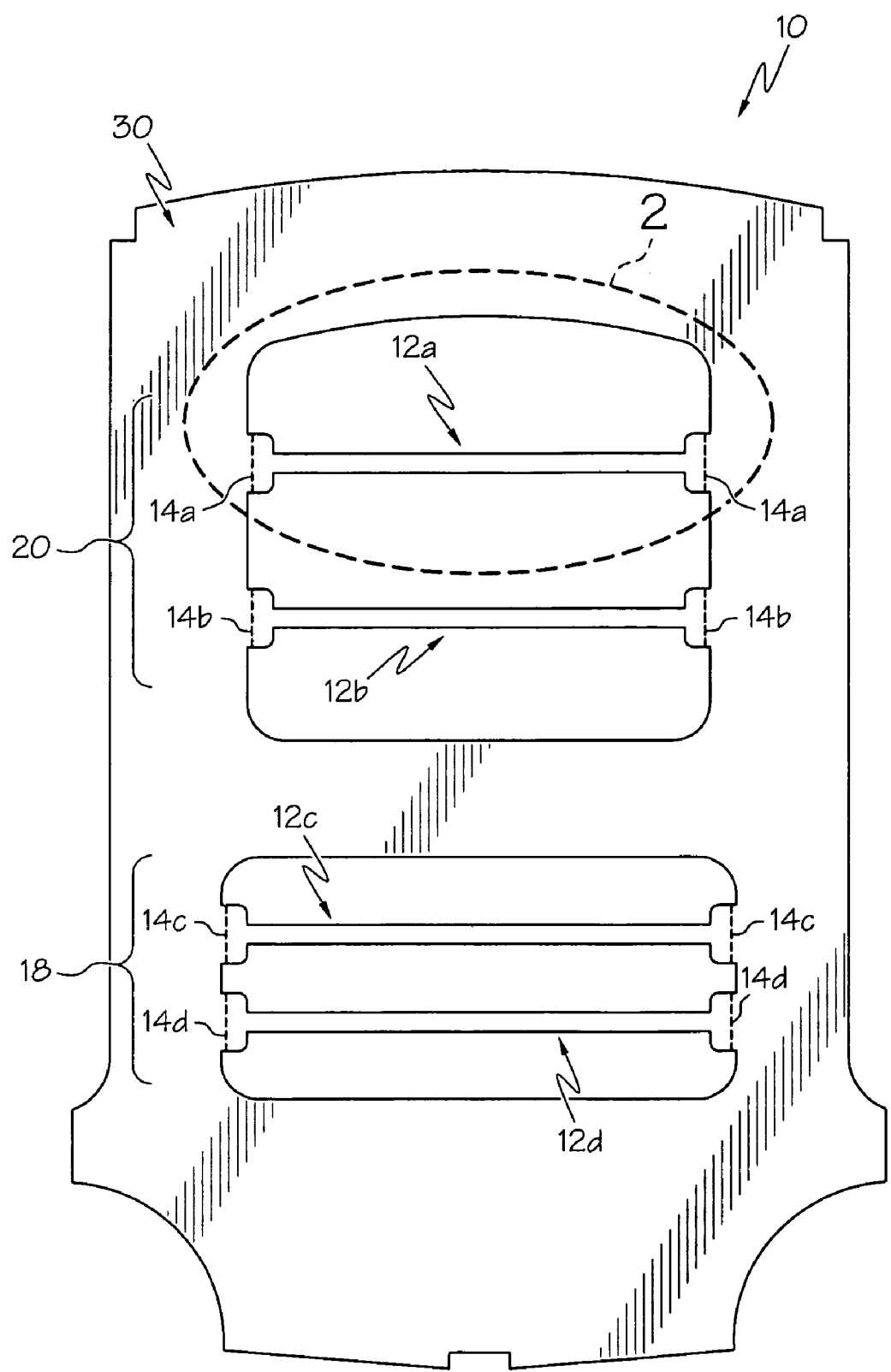
FIG. 1 is a top view of a vehicle headliner according to one or more embodiments of the present invention.

Referring initially to FIG. 1, a top view of an exemplary vehicle headliner 10 is illustrated. The exemplary vehicle headliner 10 comprises a substrate layer 30 which can be molded into a shape to match the contour of the underside of a vehicle roof. The substrate layer 30 may be molded from any conventionally available compounds, including polymeric resin, for example. The vehicle headliner 10 may also comprise a fabric layer (not shown) that covers the substrate layer 30 to provide a polished look to the interior of the vehicle (e.g., one that matches the fabric/color of the interior of the vehicle).

Still referring to FIG. 1, plurality of cutout areas 18, 20 may be located within the vehicle headliner 10. These cutout areas 18, 20 are openings within the substrate layer 30 that define a location for vehicle components such as a sunroof, overhead console, lights, safety handles, visors and the like. For example, after the vehicle headliner is installed into the vehicle, the vehicle components may be installed within the cutout areas 18, 20. It is contemplated that FIG. 1 does not illustrate all possible cutout area shapes. Particularly, FIG. 1 illustrates a sunroof cutout area 20 and an overhead console cutout area 18 according to one embodiment. It is understood that other embodiments may include numerous additional cutout areas of varying geometries.

As illustrated in FIG. 1, at least one or more handling components 12a-d may be associated with (i.e., removable) or formed (i.e., integrated) in the substrate layer 30 and within the cutout areas 18 and 20. The integrated handling components 12a-d may be at least partially separated from the surrounding substrate layer by a plurality of perforation areas or lines 14a-d. In one embodiment, the integrated handling components 12a-d may be formed during the molding process that forms the substrate layer 30. When a fabric layer is added to the substrate layer 30, the fabric layer may similarly include cutout areas corresponding to the cutout areas 18, 20 of the substrate layer 30.

Because the integrated handling components 12a-d of the exemplary embodiment are at least partially formed within the substrate layer itself, no additional assembly, material or labor is required to form the integrated handling components within the substrate layer 30. Moreover, any number of integrated handling components may be formed within any type of cutout area, depending on the method of installation and the desired use of the integrated handling components. Additionally, the integrated handling components may be of any shape. FIG. 1 illustrates the integrated handling components 12a-d as rectangularly-shaped handles. However, the handling components of other embodiments may include, for example, a series of slots that are used by a worker to hold the vehicle headliner 10 in place during installation, or one that allow insertion of a worker's fingers at a desired position. Also, the integrated handling components may be defined as D-shaped brackets along the edges of the cutout areas.

Figure 2:
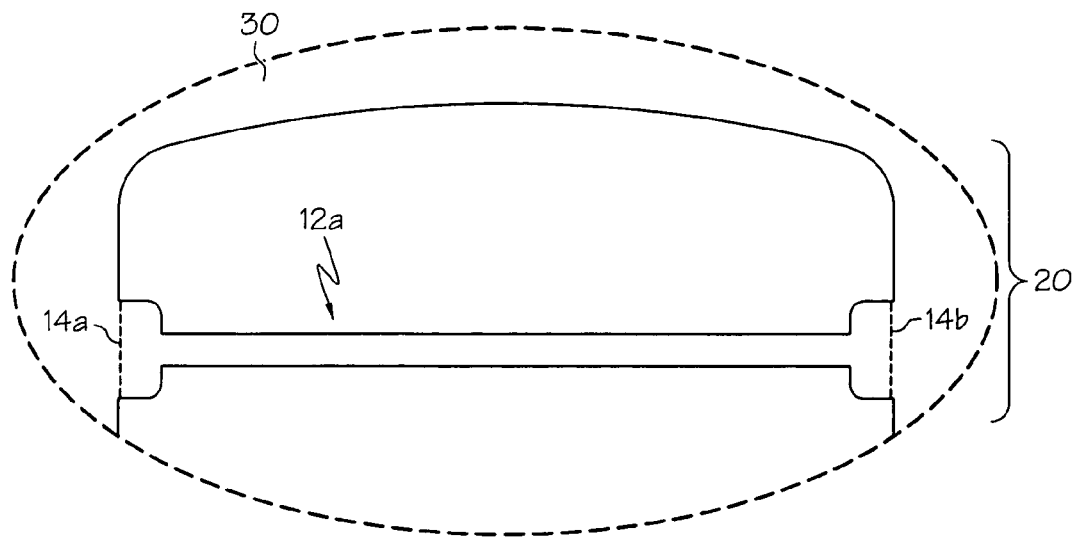
FIG. 2 is a close-up top view of a vehicle headliner illustrating an integrated handle according to one or more embodiments of the present invention.

FIG. 2 is a close-up view of an exemplary integrated handle 12a of FIG. 1 formed within a cutout area 20 according to an exemplary embodiment. As illustrated in FIG. 2, the handling component 12a may separated from the surrounding substrate layer 30 by a perforation 14a. The perforation 14a aids in the removal of the handling component 12a after installation of the vehicle headliner 10. The perforation 14a should be of a type that allows for a clean removal of the handling component 12a and also provides enough strength to prevent the handling component 12a from breaking off during carrying or installation of the vehicle headliner 10. Any component for implementing the perforation 14a may be utilized. For example, generally weaker portions of the substrate layer 30 may be formed during the molding process to define the perforation. Alternatively, a perforation line 14a may be implemented by use of a water jet to weaken the perforation line, or similarly, a laser may be used to introduce perforation 14a into the substrate layer 30.

Figure 3:
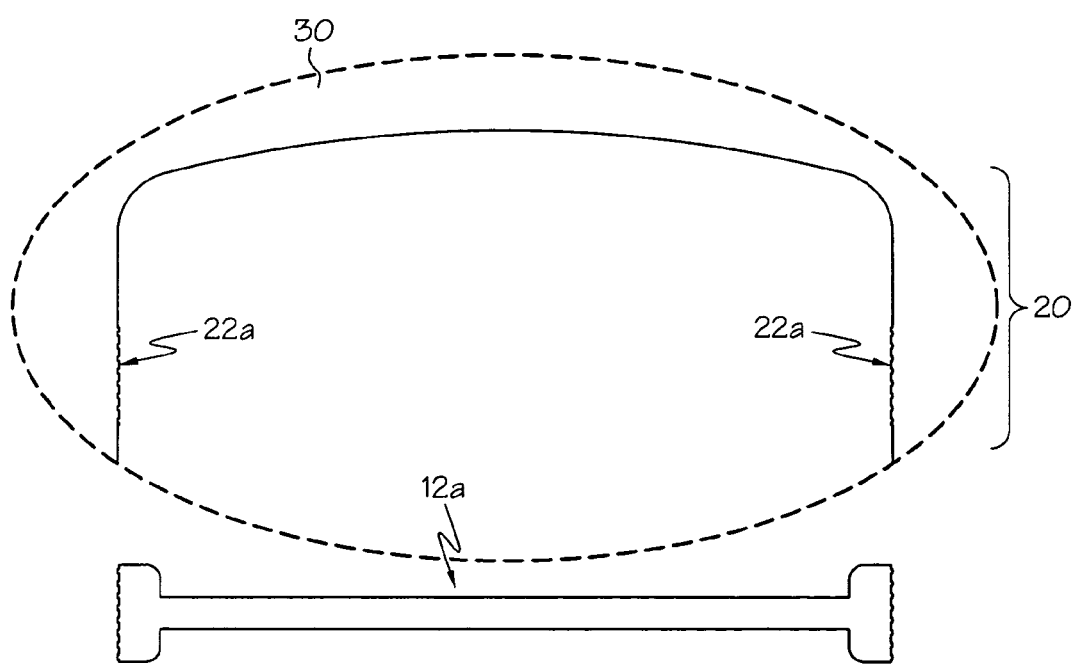
FIG. 3 is a close-up top view of a vehicle headliner illustrated an integrated handle that has been removed according to one or more embodiments of the present invention.

FIG. 3 illustrates an exemplary handling component 12a that has been removed from the substrate layer 30 and cutout area 20 in accordance with an exemplary embodiment. Rough edges 22a may be present after the removal of the handling component 12a. However, it is contemplated that a clean edge may be present after the removal of the handling component 12a from the substrate layer 30. The rough edges 22a may be concealed by the fabric layer, by the installation of various vehicle components or trimming components. The integrated handling components 12a-d may be removed by many different methods. For example, a cutting device such as a knife may be used to score the perforation 14a before pulling the handling component 12a away from the substrate layer. In another embodiment, the perforation may be such that a worker is able to rip the handling component from the substrate layer 30.

Figure 4:
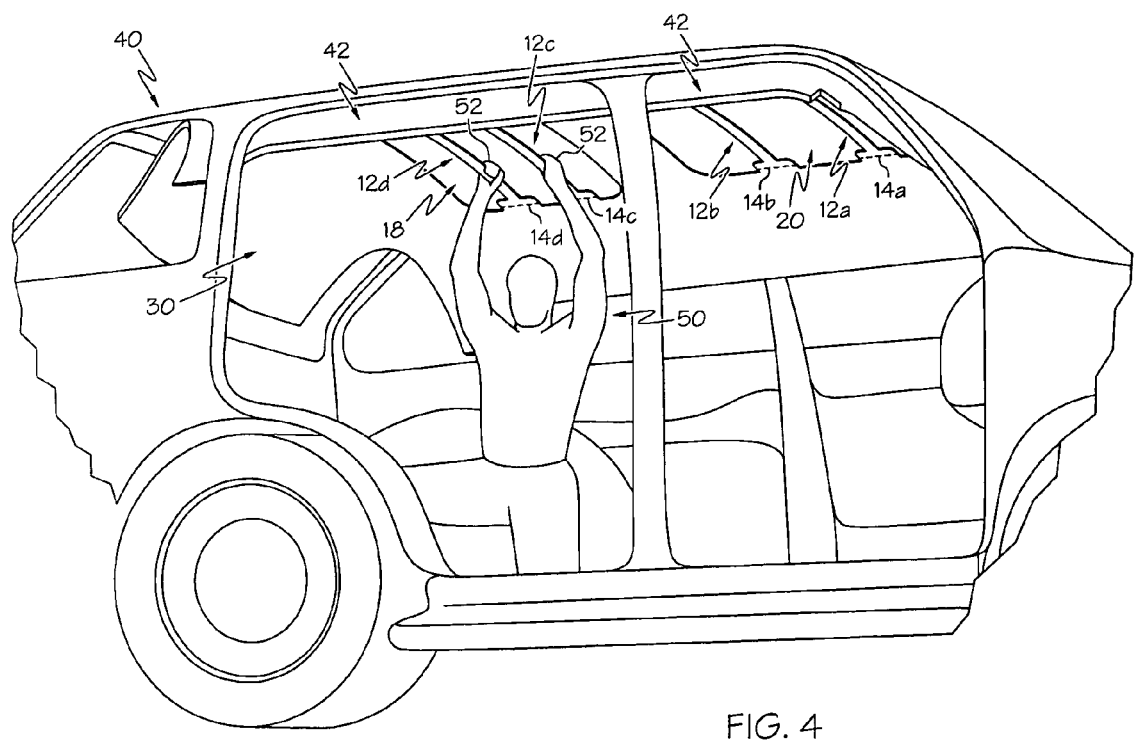
FIG. 4 is an illustration of a vehicle headliner being installing into a vehicle according to one or more embodiments of the present invention.

FIG. 4 illustrates a vehicle headliner in accordance with the embodiments discussed herein being installed into a vehicle. The integrated handling components 12a-d illustrated in FIGS. 1-4 may be used to carry the vehicle headliner 10 from one location to another, aid in handling the headliner generally, and aid in holding the vehicle headliner in place while it is installed to the ceiling 42 of a vehicle 40. For example, a worker may use the integrated handling components 12a-d to carry, move or lift the vehicle headliner 10. Additionally, the carrying, moving and lifting of the vehicle headliner 10 via the integrated handling components 12a-d may be performed by a robot or other mechanical means. Use of the integrated handling components 12a-d allows the vehicle headliner 10 to be handled in precise locations 52, thus facilitating handling, positioning and further preventing damaging or dirtying the vehicle headliner 10. For example, a worker 50 may grasp the integrated handling components 12a-d and move the vehicle headliner 10 from a first location, such as a storage or parts location, to a vehicle location, which may be the location where the vehicle headliner 10 will be installed. A worker 50 may then lift the vehicle headliner 10 by the integrated handling components 12a-d and hold the vehicle headliner 10 in place 52 while the same or another worker attaches the vehicle headliner 10 to the ceiling 42 of the vehicle. The vehicle headliner 10 may be affixed to the ceiling 42 by any number of attaching components, including, but not limited to, adhesives, screws, nuts and bolts, welded studs or snap-in fasteners. The integrated handling components 12a-d may also be utilized to aid in hanging the headliner 10 on a rack or other moveable structure.

After the vehicle headliner 10 has been installed, the plurality of integrated handling components 12a-d may be removed by pulling the integrated handling components 12a-d away from the substrate layer 30 or by trimming out the integrated handling components 12a-d. The integrated handling components 12a-d may be retained and used for different purposes after removal. For example, the removed integrated handling components 12a-d may be attached to another area of the vehicle headliner 10 by use of an adhesive, or attached by use of a mechanical slot. In the later embodiment, substrate may be formed with a slot for accepting one or more handling components the can be freely removable from one substrate layer (or headliner) to the next.

The foregoing description of the various embodiments and principles of the inventions has been presented for the purpose of illustration and description. It is not intended to be exhaustive or to limit the invention to the precise forms disclosed. Many alternatives, modifications and variations will be apparent to those skilled in the art. Moreover, although many inventive aspects have been presented, such aspects need not be utilized in combination, and various combinations of inventive aspects are possible in light of the various embodiments provided above. Accordingly, the above description is intended to embrace all possible alternatives, modifications, combinations and variations that have been discussed or suggested herein, as well as others that fall within the principles, spirit, and broad scope of the various inventions as defined by the claims.

For the purposes of describing and defining the present invention it is noted that the term "substantially" or "relatively" is utilized herein to represent the inherent degree of uncertainty that may be attributed to any quantitative comparison, value, measurement, or other representation.

What is claimed is:

1. A vehicle headliner comprising a substrate layer having at least one handling component associated with the substrate layer, the handling component having a perforation between the handling component and the surrounding substrate layer, wherein the handling component aids in the handling of the headliner.

2. The vehicle headliner of claim 1 wherein the headliner covers at least a portion of the underside of a vehicle roof.

3. The vehicle headliner of claim 1 wherein the perforation is molded into the substrate layer.

4. The vehicle headliner of claim 1 wherein the perforation is introduced into the substrate layer by a water jet.

5. The vehicle headliner of claim 1 wherein the perforation is introduced into the substrate layer by a laser.

6. The vehicle headliner of claim 1 wherein the handling component is removable from the substrate layer after handling or installing the headliner.

7. The vehicle headliner of claim 1 comprising a plurality of the handling components.

8. The vehicle headliner of claim 1 wherein the integrated handling component is removably attachable to the headliner.

9. The vehicle headliner of claim 8 wherein the integrated handling component is removably attachable to the headliner by a mechanical slot.

10. The vehicle headliner of claim 1 wherein the handling component is integrated into the headliner.

11. The vehicle headliner of claim 1 wherein the handling component is located in a plurality of cutout areas.

12. The vehicle headliner of claim 1 wherein the handling component is located along the perimeter of the headliner.

13. A headliner comprising:
  a fabric layer;
  a substrate layer;
  a plurality of handling components formed within the substrate layer; and a plurality of perforation lines located between the handling components and the surrounding substrate layer, wherein the handling components are removable from the substrate layer.

14. The vehicle headliner of claim 13 wherein the perforation lines extend at least partially around the perimeter of the integrated handling components.

15. The vehicle headliner of claim 13 wherein the handling components are integrated into the headliner.

16. The vehicle headliner of claim 13 wherein the handling components are located in a plurality of cutout areas.

17. A method of installing a headliner in a vehicle, the method comprising:
    providing a headliner comprising:
        a substrate layer;
        at least one handling component secured to the substrate layer; and
        a plurality of perforation lines located between the handling component and the surrounding substrate layer;
    moving the headliner from a first location to a vehicle location;
    positioning the headliner;
    affixing the headliner to the roof of the vehicle; and
    removing the handling component.

18. The method of installing a headliner in a vehicle of claim 17 further comprising lifting and moving the headliner to the underside of the roof of the vehicle using the at least one handling component.

19. The method of installing a headliner in a vehicle of claim 17 further comprising holding the at least one handling component during the moving the headliner from the first location to the vehicle location.

20. The method of installing a headliner in a vehicle of claim 17 wherein the handling component is integrated into the headliner.

* * * * *